US012487780B2

(12) United States Patent
Angoth et al.

(10) Patent No.: US 12,487,780 B2
(45) Date of Patent: *Dec. 2, 2025

(54) DYNAMIC PROGRAM SUSPEND DISABLE FOR RANDOM WRITE SSD WORKLOAD

(71) Applicant: SK hynix NAND Product Solutions Corp., Rancho Cordova, CA (US)

(72) Inventors: Vivek Angoth, Longmont, CO (US); David Carlton, Oakland, CA (US); Sarvesh Gangadhar, Santa Clara, CA (US); MarkAnthony Golez, Folsom, CA (US); David J. Pelster, Longmont, CO (US); Neelesh Vemula, Sunnyvale, CA (US)

(73) Assignee: SK hynix NAND Product Solutions Corp., Rancho Cordova, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/898,142

(22) Filed: Sep. 26, 2024

(65) Prior Publication Data

US 2025/0021272 A1 Jan. 16, 2025

Related U.S. Application Data

(63) Continuation of application No. 17/241,976, filed on Apr. 27, 2021, now Pat. No. 12,131,064.

(51) Int. Cl.
*G06F 3/06* (2006.01)

(52) U.S. Cl.
CPC .......... *G06F 3/0659* (2013.01); *G06F 3/0605* (2013.01); *G06F 3/0614* (2013.01); *G06F 3/0653* (2013.01); *G06F 3/0679* (2013.01)

(58) Field of Classification Search
CPC .... G06F 3/0659; G06F 3/0605; G06F 3/0614; G06F 3/0653; G06F 3/0679
See application file for complete search history.

(56) References Cited

U.S. PATENT DOCUMENTS

| 2013/0086324 | A1 | 4/2013 | Soundarajan et al. |
| 2013/0185526 | A1 | 7/2013 | Iglesia et al. |
| 2013/0205085 | A1 | 8/2013 | Hyun et al. |
| 2016/0313946 | A1* | 10/2016 | Zang ..................... G06F 3/0611 |
| 2019/0004710 | A1 | 1/2019 | Ebsen et al. |
| 2019/0095348 | A1 | 3/2019 | Peng et al. |
| 2020/0026465 | A1 | 1/2020 | Jung et al. |

(Continued)

OTHER PUBLICATIONS

Wu, Guanying, and Xubin He. "Reducing SSD read latency via NAND flash program and erase suspension." FAST. vol. 12. 2012. (Year: 2012).*

(Continued)

*Primary Examiner* — Nicholas J Simonetti
(74) *Attorney, Agent, or Firm* — Byrne Poh LLP

(57) ABSTRACT

An embodiment of an electronic apparatus may include one or more substrates, and a controller coupled to the one or more substrates, the controller including circuitry to control access to NAND-based storage media that includes a plurality of NAND devices, determine if a current workload for a particular NAND device of the plurality of NAND devices is a random write workload, and, if so determined, disable a program suspend operation for only the particular NAND device. Other embodiments are disclosed and claimed.

21 Claims, 8 Drawing Sheets

(56) References Cited

U.S. PATENT DOCUMENTS

| | | | |
|---|---|---|---|
| 2020/0159444 A1 | 5/2020 | Jo | |
| 2020/0285416 A1 | 9/2020 | Wu et al. | |
| 2020/0356312 A1 | 11/2020 | Liu et al. | |
| 2021/0096985 A1* | 4/2021 | Kim | G06F 3/0652 |
| 2021/0109673 A1 | 4/2021 | Jin et al. | |
| 2021/0247937 A1 | 8/2021 | Angoth et al. | |

OTHER PUBLICATIONS

Maejima, Hiroshi, et al. "A 512Gb 3b/Cell 3D flash memory on a 96-word-line-layer technology." 2018 IEEE International Solid-State Circuits Conference—(ISSCC). IEEE, 2018. (Year: 2018).*

Extended European Search Report dated Feb. 7, 2025 in EP Patent Application No. 22796575.3, pp. 1-13.

International Preliminary Report on Patentability dated Nov. 9, 2023 in International Application No. PCT/US2022/026393, pp. 1-5.

International Search Report and Written Opinion dated Aug. 9, 2022 in International Patent Application No. PCT/US2022/026393, pp. 1-12.

Notice of Allowance dated Jul. 3, 2024 in U.S. Appl. No. 17/241,976, pp. 1-29.

Office Action dated May 13, 2025 in JP Patent Application No. 2023-557058, pp. 1-7.

Office Action dated Jul. 1, 2025 in KR Patent Application No. 10-2023-7040796, pp. 1-12.

Wei, Q., et al., "CBM: a cooperative buffer management for SSD", In Proceedings of the 30th Symposium on Mass Storage Systems and Technologies, Jun. 2, 2014, pp. 1-12.

Wu, G., et al., "Reducing SSD Access Latency via NAND Flash Program and Erase Suspension", In the Journal of Systems Architecture, vol. 60, No. 4, 2014, pp. 345-356.

Office Action dated Sep. 18, 2025 in JP Patent Application No. 2023-557058, pp. 1-8.

* cited by examiner

DYNAMIC PROGRAM SUSPEND DISABLE FOR RANDOM WRITE SSD WORKLOAD

CROSS-REFERENCE TO RELATED APPLICATION

This application is a continuation of U.S. patent application Ser. No. 17/241,976, filed Apr. 27, 2021, which is hereby incorporated by reference herein in its entirety.

BACKGROUND

Certain NAND media devices may allow either a single read or single program operation command (i.e., a write command) to access a NAND device or NAND array in a NAND device at a time, where a NAND array may comprise an array of NAND strings, and where a NAND string may comprise a plurality of NAND cells. A program operation may be suspended to accommodate a waiting read operation, and then on completion of the read operation, the program operation may be resumed. This is referred to as a suspend-resume of the program operation. Program operation latencies may be an order of magnitude larger than read operation latencies and, to improve read operation latencies, NAND solid-state drives (SSDs) leverage the program operation suspend-resume (PSR) capability of the NAND device(s) to suspend (pause) an in-progress program operation to the NAND array and then allow one or more queued read operations to proceed and complete before resuming the suspended program operation. A program operation on a NAND device or NAND array in a NAND device performs a write operation on the NAND media. A program operation may be performed for programming (i.e., writing) to a NAND, such as a multi-level cell (MLC) NAND. Program operations may also be performed for other types of NAND (e.g., quad level cell (QLC), tri-level cell (TLC), single level cell (SLC), etc.) and other types of non-volatile memory.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
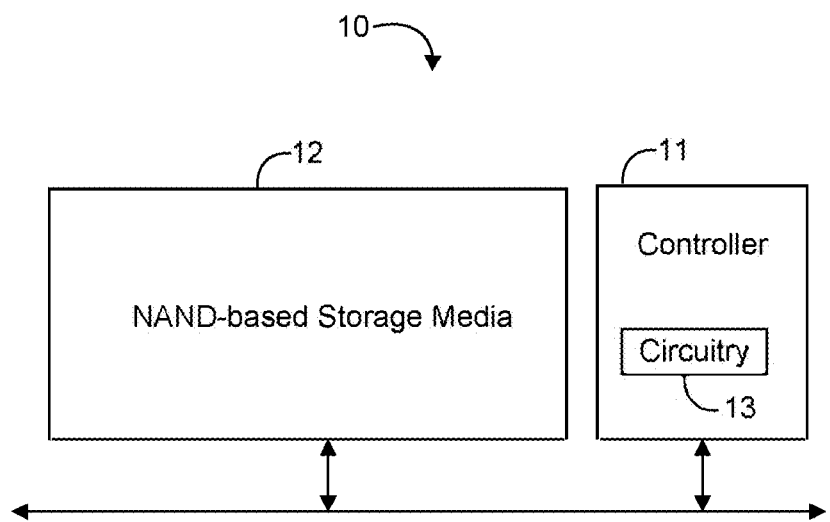
FIG. 1 is a block diagram of an example of an electronic storage system according to an embodiment.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Various embodiments described herein may include a memory component and/or an interface to a memory component. Such memory components may include volatile and/or nonvolatile (NV) memory. Volatile memory may be a storage medium that requires power to maintain the state of data stored by the medium. Non-limiting examples of volatile memory may include various types of RAM, such as dynamic RAM (DRAM) or static RAM (SRAM). One particular type of DRAM that may be used in a memory module is synchronous dynamic RAM (SDRAM). NV memory (NVM) may be a storage medium that does not require power to maintain the state of data stored by the medium. In one embodiment, the memory device may include a block addressable memory device, such as those based on NAND technologies. In one embodiment, the memory device may be or may include memory devices that use multi-threshold level NAND flash memory, or other memory. The memory device may refer to the die itself and/or to a packaged memory product.

With reference to FIG. 1, an embodiment of an electronic storage system 10 may include NAND-based storage media 12 that includes a plurality of NAND devices, and a controller 11 communicatively coupled to the NAND-based storage media 12. For example, a NAND device may correspond to a single NAND die. The controller 11 may include circuitry 13 to determine if a current workload for a particular NAND device of the plurality of NAND devices is a random write workload, and, if so determined, to disable a program suspend operation for only the particular NAND device. In some embodiments, the circuitry 13 may be further configured to determine if a host read is pending for the particular NAND device, and, if so determined, to enable the program suspend operation for only the particular NAND device.

For example, the circuitry 13 may be configured to maintain a command queue for each of the plurality of NAND devices (e.g., a NAND Device Queue (NDQ)), and to maintain a counter value associated with each of the command queues to count respective host reads for each of the command queues. In some embodiments, the circuitry 13 may be further configured to increment the counter value associated with the command queue for the particular NAND device when a command from a host read is placed in the command queue for the particular NAND device, and to decrement the counter value associated with the command queue for the particular NAND device when the command from the host read is removed from the command queue for the particular NAND device. For example, the circuitry 13 may also be configured to determine that the current workload for the particular NAND device of the plurality of NAND devices is the random write workload if the counter value associated with the command queue for the particular NAND device is zero, and to determine that the host read is pending for the particular NAND device if the counter value associated with the command queue for the particular NAND device is non-zero. In any of the embodiments herein, the controller 11 and the NAND-based storage media 12 may be incorporated in a solid-state drive (SSD).

Embodiments of each of the above controller 11. NAND-based storage media 12, circuitry 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the controller 11 may include a general purpose controller, a special purpose controller, a memory controller, a storage controller, a micro-controller, a general purpose processor, a special purpose processor, a central processor unit (CPU), an execution unit, etc. In some embodiments, the NAND-based storage media 12, the circuitry 13, and/or other system memory may be located in, or co-located with, various components, including the controller 11 (e.g., on a same die).

Alternatively, or additionally, all or portions of these components may be implemented in one or more modules as a set of logic instructions stored in a machine- or computer-readable storage medium such as RAM, ROM, programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the NAND-based storage media 12, other NAND-based storage media, or other system memory may store a set of instructions which when executed by the controller 11 cause the system 10 to implement one or more components, features, or aspects of the system 10 (e.g., the circuitry 13, determining if the current workload for the particular NAND device is the random write workload, disabling the program suspend operation for only the particular NAND device, etc.).

Figure 2:
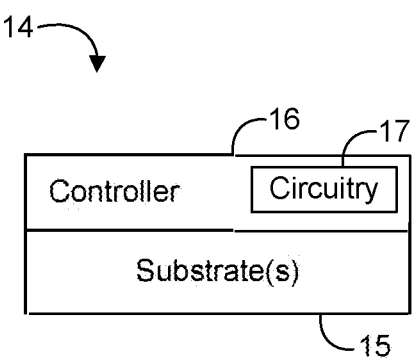
FIG. 2 is a block diagram of an example of an electronic apparatus according to an embodiment.

Turning now to FIG. 2, an embodiment of an electronic apparatus 14 may include one or more substrates 15, and a controller 16 coupled to the one or more substrates 15. The controller 16 may include circuitry 17 to control access to NAND-based storage media that includes a plurality of NAND devices, determine if a current workload for a particular NAND device of the plurality of NAND devices is a random write workload, and, if so determined, disable a program suspend operation for only the particular NAND device. In some embodiments, the circuitry 17 may be further configured to determine if a host read is pending for the particular NAND device, and, if so determined, to enable the program suspend operation for only the particular NAND device.

For example, the circuitry 17 may be configured to maintain a command queue for each of the plurality of NAND devices, and to maintain a counter value associated with each of the command queues to count respective host reads for each of the command queues. In some embodiments, the circuitry 17 may be further configured to increment the counter value associated with the command queue for the particular NAND device when a command from a host read is placed in the command queue for the particular NAND device, and to decrement the counter value associated with the command queue for the particular NAND device when the command from the host read is removed from the command queue for the particular NAND device. For example, the circuitry 17 may also be configured to determine that the current workload for the particular NAND device of the plurality of NAND devices is the random write workload if the counter value associated with the command queue for the particular NAND device is zero, and to determine that the host read is pending for the particular NAND device if the counter value associated with the command queue for the particular NAND device is non-zero. In any of the embodiments herein, the controller and the NAND-based storage media may be incorporated in a solid-state drive (SSD).

Embodiments of the circuitry 17 may be implemented in a system, apparatus, computer, device, etc., for example, such as those described herein. More particularly, hardware implementations of the circuitry 17 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the circuitry 17 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the circuitry 17 may be implemented on a semiconductor apparatus, which may include the one or more substrates 15, with the circuitry 17 coupled to the one or more substrates 15. In some embodiments, the circuitry 17 may be at least partly implemented in one or more of configurable logic and fixed-functionality hardware logic on semiconductor substrate(s) (e.g., silicon, sapphire, gallium-arsenide, etc.). For example, the circuitry 17 may include a transistor array and/or other integrated circuit components coupled to the substrate(s) 15 with transistor channel regions that are positioned within the substrate(s) 15. The interface between the circuitry 17 and the substrate(s) 15 may not be an abrupt junction. The circuitry 17 may also be considered to include an epitaxial layer that is grown on an initial wafer of the substrate(s) 15.

Figure 3A:
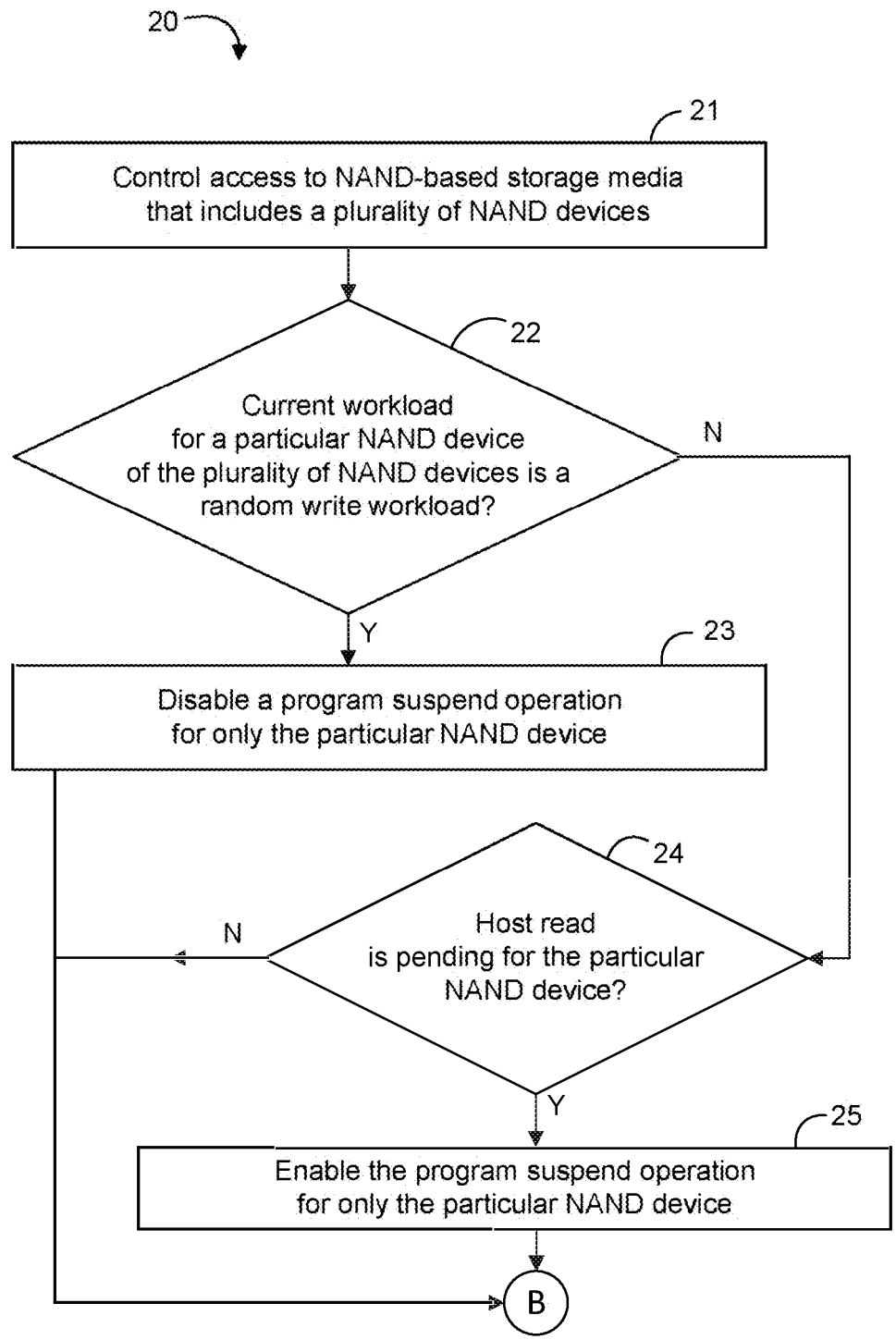
FIGS. 3A to 3B is a flowchart of an example of a method of controlling storage according to an embodiment.
Figure 3B:
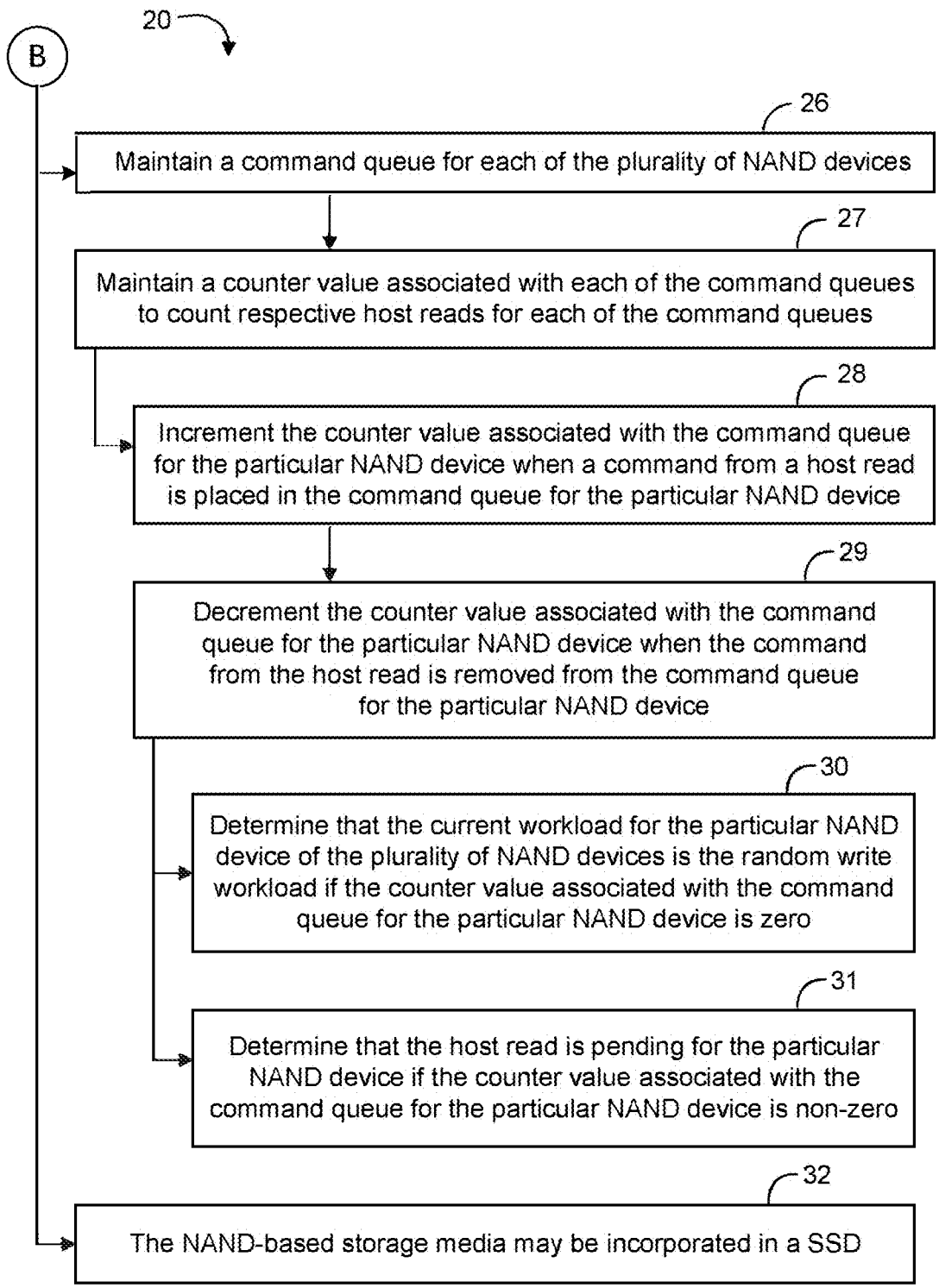

Turning now to FIGS. 3A to 3B, an embodiment of a method 20 of controlling storage may include controlling access to NAND-based storage media that includes a plurality of NAND devices at block 21, determining if a current workload for a particular NAND device of the plurality of NAND devices is a random write workload at block 22, and, if so determined, disabling a program suspend operation for only the particular NAND device at block 23. Some embodiments of the method 20 may further include determining if a host read is pending for the particular NAND device at block 24, and, if so determined, enabling the program suspend operation for only the particular NAND device at block 25.

For example, the method 20 may also include maintaining a command queue for each of the plurality of NAND devices at block 26, and maintaining a counter value associated with each of the command queues to count respective host reads for each of the command queues at block 27. Some embodiments of the method 20 may further include incrementing the counter value associated with the command queue for the particular NAND device when a command from a host read is placed in the command queue for the particular NAND device at block 28, and decrementing the counter value associated with the command queue for the particular NAND device when the command from the host read is removed from the command queue for the particular NAND device at block 29. For example, the method 20 may also include determining that the current workload for the particular NAND device of the plurality of NAND devices is the random write workload if the counter value associated with the command queue for the particular NAND device is zero at block 30, and/or determining that the host read is pending for the particular NAND device if the counter value associated with the command queue for the particular NAND device is non-zero at block 31. In any of the embodiments herein, the NAND-based storage media may be incorporated in a SSD at block 32.

Embodiments of the method 20 may be implemented in a system, apparatus, computer, device, etc., for example, such as those described herein. More particularly, hardware implementations of the method 20 may include configurable logic such as, for example, PLAs, FPGAs, CPLDs, Course-Grained Reconfigurable Fabric (CGRA), or in fixed-functionality logic hardware using circuit technology such as, for example, ASIC, CMOS, or TTL technology, or any combination thereof. Alternatively, or additionally, the method 20 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 20 may be implemented on a computer readable medium as described in connection with Examples 22 to 28 below. Embodiments or portions of the method 20 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some embodiments may advantageously provide technology to optimize random write performance of a SSD. Some NAND media systems allow either a program command (i.e. write) or a read command to access the NAND array at a time. Because the program latencies can be an order of magnitude larger than read latencies, to improve host read latencies (e.g., an important metric for SSD customers), some NAND SSDs may leverage a Program Suspend-Resume (PSR) capability of the NAND SSD which allows the in-progress program operation to be suspended (paused), and then allows one or more queued host reads to be completed before resuming the suspended program operation.

One bottleneck of throughput of random write workloads in a SSD is the NAND programming time (tProg). The SSD internally reads invalidated data from the NAND array to program it to a new location to free up new unwritten space during random write workloads. A problem is that suspending the program operations due to incoming internal reads in the random write workload increases time to complete the program commands and thus contributes overhead to bottleneck the throughput of the random write workload. Advantageously, some embodiments provide technology to improve random write SSD performance with little or minimal impact on host read latencies.

Some embodiments provide technology to remove or disable PSR commands during a random write workload, but not any other workloads. Advantageously, some embodiments allow the effective tProg to be reduced or minimized, thereby increasing utilization of the available SSD controller bandwidth for NAND device operations. Some embodiments may be effectively utilized for a random write workload because no host reads are present during the random write workload, thereby allowing the SSD to improve or optimize the workload for host throughput during the random write workload, while also ensuring no impact to host read latencies in other workloads. Advantageously, some embodiments may be implemented with relatively low complexity technology that provides a significant benefit to random write throughput without negatively impacting key SSD metrics such as host read latency in random read and any mixed read/write workloads.

Random write workloads in a NAND SSD generate internal reads by the SSD controller in order to move data from one NAND location to a new NAND location in order to garbage collect NAND that has been written by the host but is no longer valid so that the invalid NAND can be reclaimed for new writes. During the process of garbage collection, the SSD controller generally reads the remaining valid host write data out of the target eviction NAND devices and into the SSD controller so that the host write data can be corrected with error correction code (ECC) algorithms before the host write data can be scheduled to be written to its new NAND location. Some embodiments advantageously distinguish the internal reads that target the NAND devices from host reads that target NAND devices, and enable PSR operations only when host reads are present in a target NDQ.

A SSD controller channel may refer to a specialized direct memory access (DMA) engine to move data between a SSD controller and NAND devices. Channel overhead may refer to any additional non-essential DMA command or status command traffic that consumes bandwidth on the channel.

Some embodiments disable PSR operations only during a random write workload, advantageously improving random write throughput by reducing or minimizing channel overhead and increasing or maximizing throughput by reducing the effective tProg. Disabling PSR in other workloads, however, causes read latencies to increase, in particular for mixed workloads, as reads would need to wait for programs in front of the reads to complete before being dispatched. Some embodiments dynamically enable and disable PSR operations such that host read latencies are not impacted for mixed read/write workloads. Advantageously, PSR overhead is also reduced or eliminated from random write workloads so as to improve throughput of random write workloads.

In some embodiments, dynamic PSR disabling is performed locally at a per NAND device level, not at the global SSD level. Advantageously, such local, dynamic PSR disabling may scale to any random write workload that may be localized to only a subset of NAND devices in the SSD. Non-limiting examples of where a random write workload may be localized to only a subset of NAND devices includes: if the SSD implements NVM Express (NVMe) Sets, NVMe Endurance Groups that exposes NAND partitioning to the host, etc.; if the SSD implements internal NAND partitioning in the form of media banking; if the host workload is bursty in its random writes; or if the SSD implements any kind of NVMe host specification that allows any kind of precise or imprecise host write data placement which would expose some, and not all, NAND devices to internal reads for garbage collection (e.g., or even media policies).

Some embodiments may provide technology to dynamically disable PSR only for random write workloads localized per NAND device. Similarly (e.g., additionally or alternatively), some embodiments may provide technology to enable PSR only when a NAND device is targeted with a host read and/or has a host read pending.

A SSD may incorporate technology that provides a software queue that keeps track of NAND commands to be dispatched to a NAND device while the NAND device is busy with an in progress command. In some implementations, the software queue may be referred to as the NAND Device Queue (NDQ). Some embodiments provide a counter (e.g., implemented in the SSD controller), that is hereinafter referred to as a Host Read Counter (HRC), that is maintained to track the number of host reads in the NDQ. In some embodiments, the HRC may be the primary mechanism used to determine whether the NDQ management should enable PSR operations or disable PSR operations for the NAND device that is associated with its NDQ. Each NDQ has its own counter instance, such that each NAND device has a localized workload targeting the NAND device. For example, if the SSD has 10 NAND devices attached to the SSD controller, then there would be 10 NDQs, and therefore 10 HRCs, with one HRC per NDQ. Additionally, depending on the SSD architecture and the host workload, each NDQ may experience a different workload. As such, the remainder of the description in connection with embodiments, a workload refers to the localized per NAND device workload.

Figure 4:
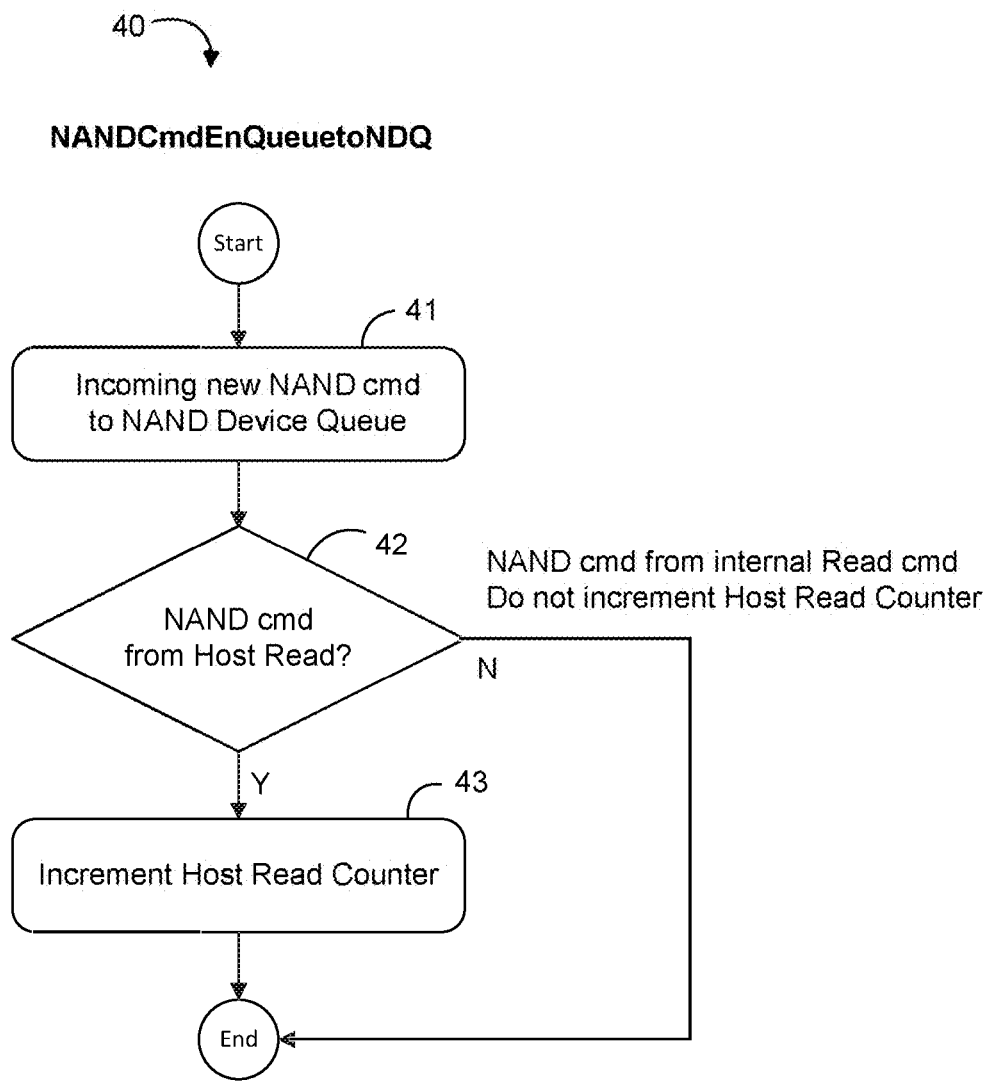
FIG. 4 is a flowchart of another example of a method of controlling storage according to an embodiment.

With reference to FIG. 4, an embodiment of a method 40 of controlling storage may be referred to as NANDCmdEnQueuetoNDQ. When the SSD controller determines the NAND device target for a new NAND command, the SSD controller is ready to queue the command to its target NAND Device Queue. The incoming new NAND command is added to the NDQ at box 41. If the new NAND command to be queued into the NDQ is a NAND command generated from a host read command at box 42, then the HRC is incremented at box 43 for the associated NDQ. If the NAND read command is generated internally by the SSD controller, e.g., for garbage collection, then the counter is not incremented. Later, when a NAND read command that is generated from a host read is removed from the NDQ, the HRC is decremented (see FIG. 5).

Figure 5:
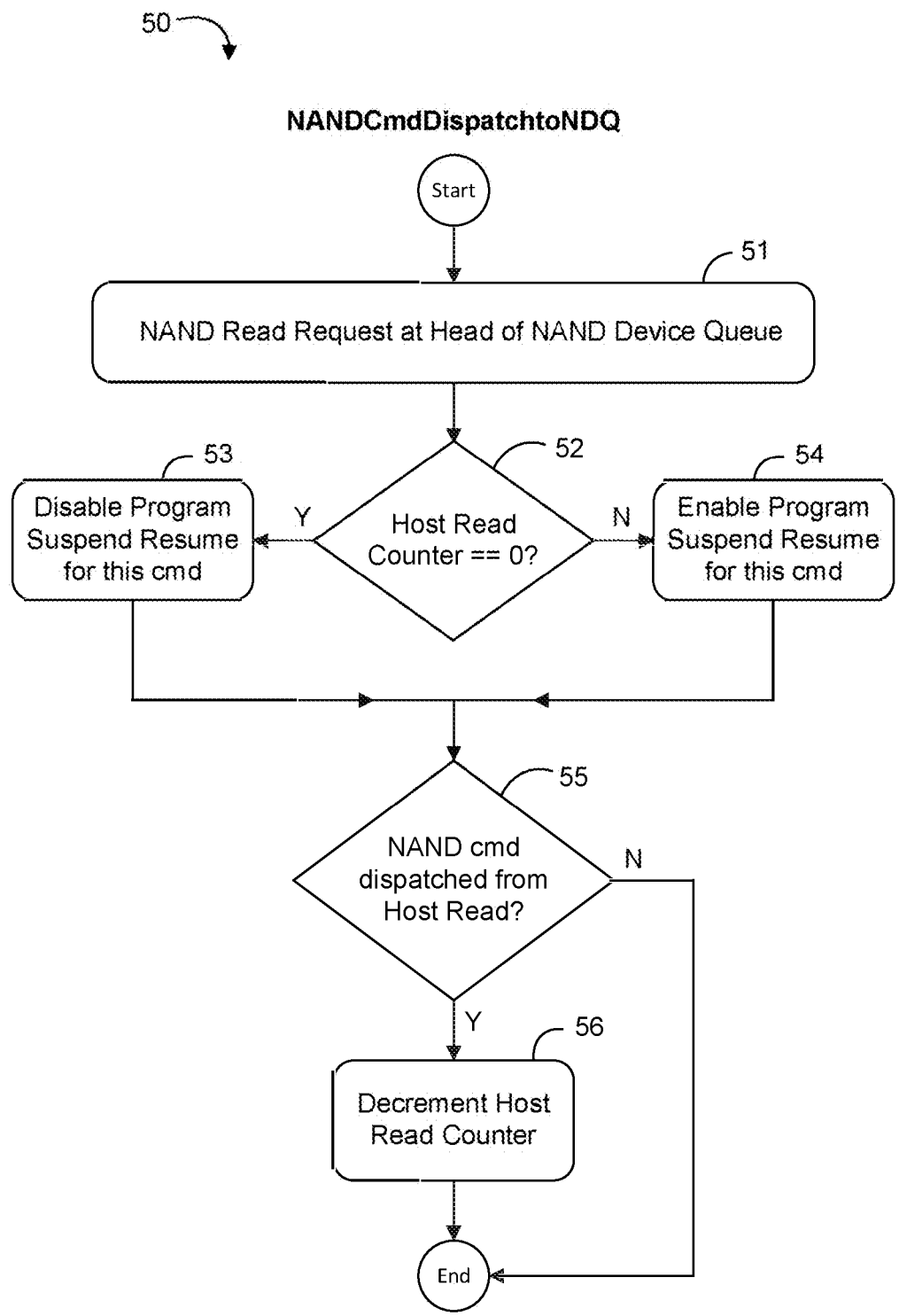
FIG. 5 is a flowchart of another example of a method of controlling storage according to an embodiment.

With reference to FIG. 5, an embodiment of a method 50 of controlling storage may be referred to as NANDCmdDispatchtoNDQ. When any NAND read request (e.g., internal or host) reaches the head of the NDQ at box 51 (e.g., the read request is about to be dispatched to the SSD controller channel and therefore to the target NAND device), the HRC for that NDQ is evaluated at box 52. If the HRC is zero at box 52 (e.g., signifying that the current workload is a random write workload), then PSR is disabled for this command at box 53. The NAND read command in this case must be an internal SSD controller read, and not a host read, and thus will be forced to wait till an ongoing program to complete, if there is a program outstanding to the target device, before the (internal) read can be dispatched to the target NAND device.

If the HRC is not zero at box 52 (e.g., signifying that the current workload contains NAND command generated from host reads commands), then PSR is enabled for this command at box 54). If a program is ongoing on the target device associated with the NDQ, then the NDQ may be mixed with both host and internal read commands, so the PSR operation is enabled, and the program suspend operation may be issued per PSR policies which may pause the ongoing program and allow the NAND read command to be dispatched after the program is suspended. The method 50 may then proceed to determining if the NAND command was dispatched from a host read at box 55, and, if so determined, decrementing the HRC at box 56.

Disabling PSR when no host reads are present in the NDQ and enabling PSR when host reads are present in the NDQ maintains the read latency benefits for host read commands in pure read and mixed read/write workloads, while dynamically ensuring that PSR operations and the associated channel overhead is eliminated from a random write workload. Advantageously, as compared to a similarly configured baseline without local, dynamic PSR disabling, some embodiments show a significant improvement in terms of input/output operations per second (IOPS), effective tProg, and random write workload performance.

Figure 6:
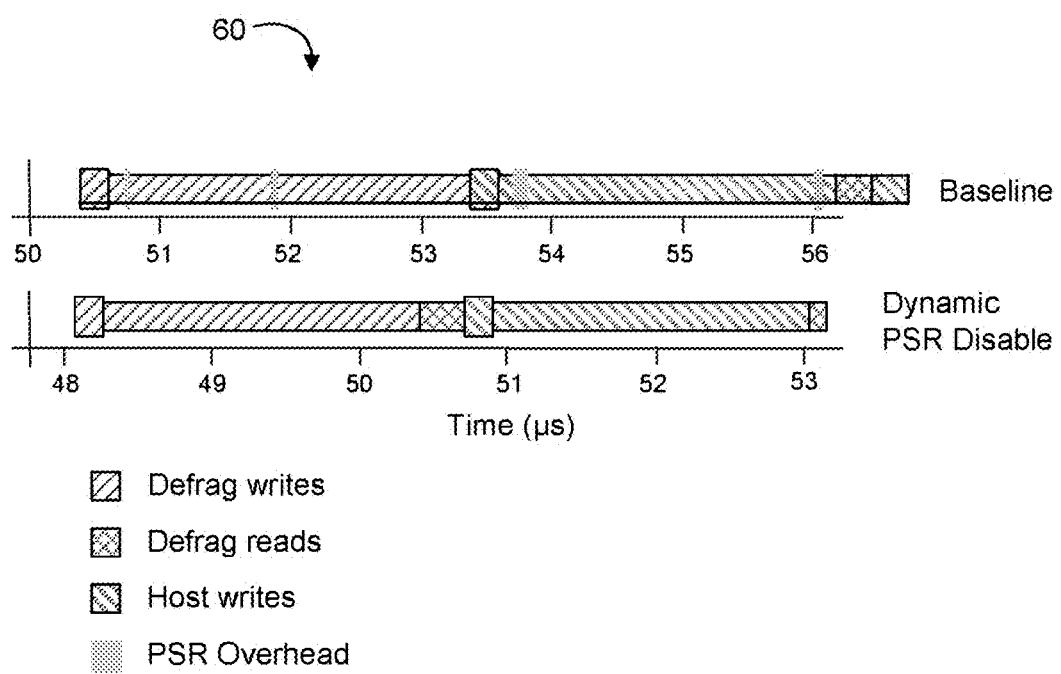
FIG. 6 is an illustrative diagram comparing timing of different NAND operations according to an embodiment against a baseline.

With reference to FIG. 6, an illustrative timing diagram 60 compares the baseline against an embodiment with local, dynamic PSR disable technology on a single NAND device. As shown in FIG. 6, PSR overhead is substantially eliminated in the embodiment with local, dynamic PSR disable technology and in the baseline the host write takes more time as compared to the embodiment with local, dynamic PSR disable technology. The improvement in tProg may be attributed to the reduction in PSR overhead and not allowing a read to interrupt the progress of the ongoing program.

The technology discussed herein may be provided in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK computing device, smart watch, smart glasses, smart bracelet, etc., and/or a client/edge device such as an Internet-of-Things (IoT) device (e.g., a sensor, a camera, etc.)).

Figure 7:
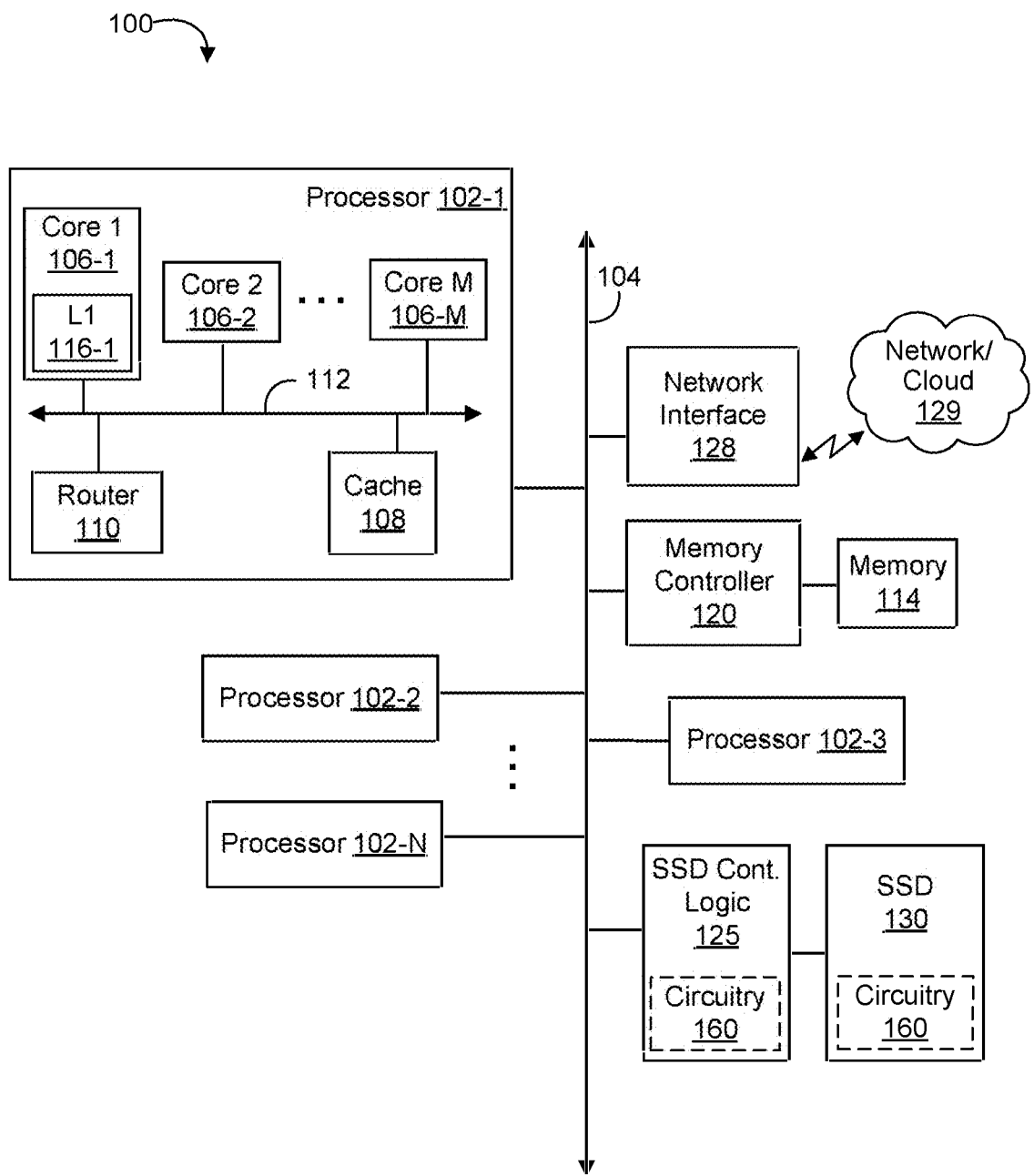
FIG. 7 is a block diagram of another example of a computing system according to an embodiment.

Turning now to FIG. 7, an embodiment of a computing system 100 may include one or more processors 102-1 through 102-N (generally referred to herein as "processors 102" or "processor 102"). The processors 102 may communicate via an interconnection or bus 104. Each processor 102 may include various components some of which are only discussed with reference to processor 102-1 for clarity. Accordingly, each of the remaining processors 102-2 through 102-N may include the same or similar components discussed with reference to the processor 102-1.

In some embodiments, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as cache 108), buses or interconnections (such as a bus or interconnection 112), memory controllers, or other components.

In some embodiments, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that is utilized by one or more components of the processor 102-1, such as the cores 106. For example, the cache 108 may locally cache data stored in a memory 114 for faster access by the components of the processor 102. As shown in FIG. 7, the memory 114 may be in communication with the processors 102 via the interconnection 104. In some embodiments, the cache 108 (that may be shared) may have various levels, for example, the cache 108 may be a mid-level cache and/or a last-level cache (LLC). Also, each of the cores 106 may include a level 1 (L1) cache (116-1) (generally referred to herein as "L1 cache 116"). Various components of the processor 102-1 may communicate with the cache 108 directly, through a bus (e.g., the bus 112), and/or a memory controller or hub.

As shown in FIG. 7, memory 114 may be coupled to other components of system 100 through a memory controller 120. Memory 114 may include volatile memory and may be interchangeably referred to as main memory or system memory. Even though the memory controller 120 is shown to be coupled between the interconnection 104 and the memory 114, the memory controller 120 may be located elsewhere in system 100. For example, memory controller 120 or portions of it may be provided within one of the processors 102 in some embodiments.

The system 100 may communicate with other devices/systems/networks via a network interface 128 (e.g., which is in communication with a computer network and/or the cloud 129 via a wired or wireless interface). For example, the network interface 128 may include an antenna (not shown) to wirelessly (e.g., via an Institute of Electrical and Electronics Engineers (IEEE) 802.11 interface (including IEEE 802.11a/b/g/n/ac, etc.), cellular interface, 3G, 4G, LTE, BLUETOOTH, etc.) communicate with the network/cloud 129.

System 100 may also include a storage device such as a SSD 130 coupled to the interconnect 104 via SSD controller logic 125. Hence, logic 125 may control access by various components of system 100 to the SSD 130. Furthermore, even though logic 125 is shown to be directly coupled to the interconnection 104 in FIG. 7, logic 125 can alternatively communicate via a storage bus/interconnect (such as the SATA (Serial Advanced Technology Attachment) bus, Peripheral Component Interconnect (PCI) (or PCI EXPRESS (PCIe) interface), NVM EXPRESS (NVMe), etc.) with one or more other components of system 100 (for example where the storage bus is coupled to interconnect 104 via some other logic like a bus bridge, chipset, etc.) Additionally, logic 125 may be incorporated into memory controller logic (such as those discussed with reference to FIG. 8) or provided on a same integrated circuit (IC) device in various embodiments (e.g., on the same circuit board device as the SSD 130 or in the same enclosure as the SSD 130).

Furthermore, logic 125 and/or SSD 130 may be coupled to one or more sensors (not shown) to receive information (e.g., in the form of one or more bits or signals) to indicate the status of or values detected by the one or more sensors. These sensor(s) may be provided proximate to components of system 100 (or other computing systems discussed herein), including the cores 106, interconnections 104 or 112, components outside of the processor 102. SSD 130, SSD bus, SATA bus, logic 125, circuitry 160, etc., to sense variations in various factors affecting power/thermal behavior of the system/platform, such as temperature, operating frequency, operating voltage, power consumption, and/or inter-core communication activity, etc.

Figure 8:
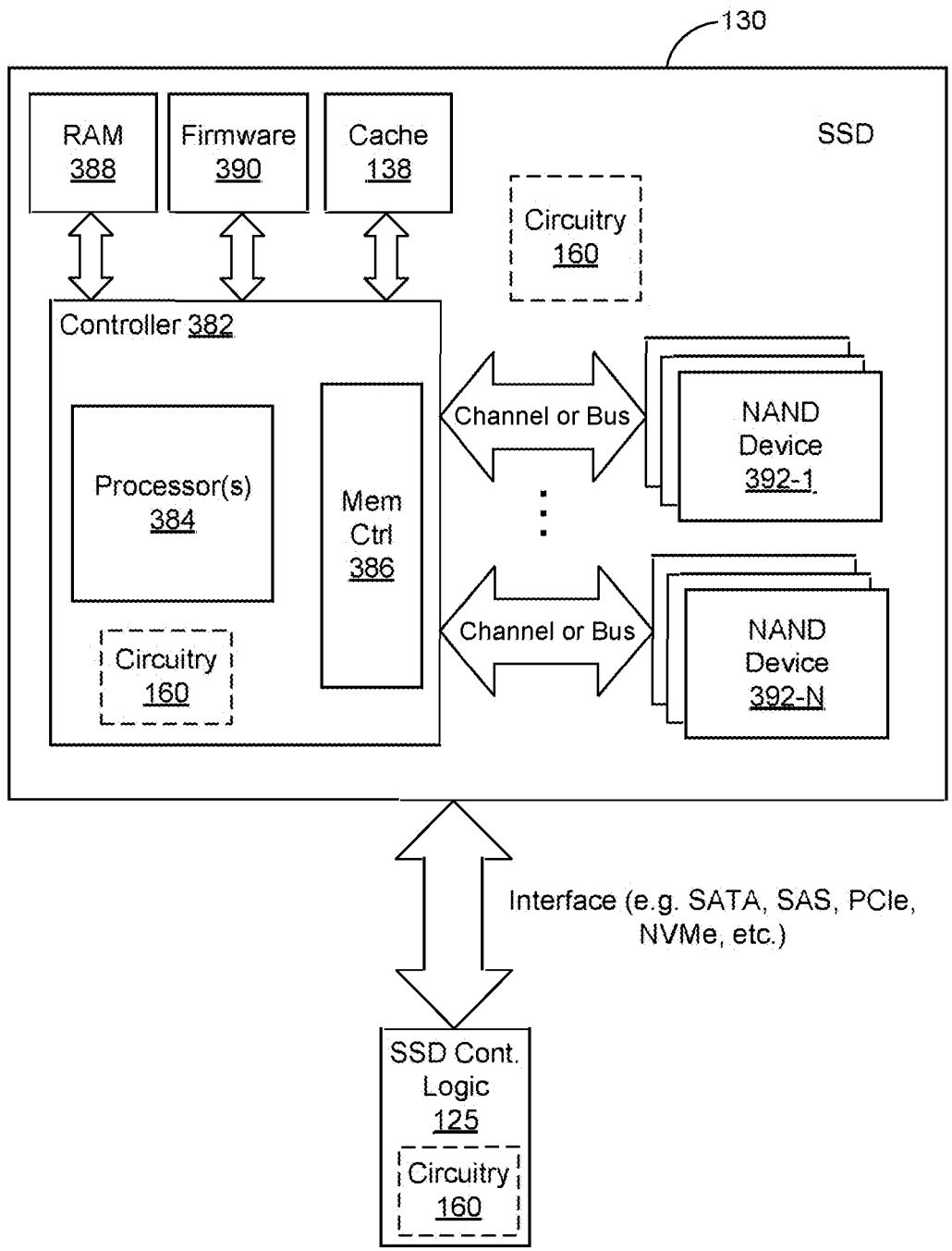
FIG. 8 is a block diagram of an example of a solid-state drive (SSD) device according to an embodiment.

FIG. 8 illustrates a block diagram of various components of the SSD 130, according to an embodiment. As illustrated in FIG. 8, circuitry 160 may be located in various locations such as inside the SSD 130 or controller 382, etc., and may include similar technology as discussed in connection with FIG. 7. The SSD 130 includes a controller 382 (which in turn includes one or more processor cores or processors 384 and memory controller logic 386), cache 138, RAM 388, firmware storage 390, and one or more NAND devices 392-1 to 392-N (collectively NAND media 392). The NAND media 392 is coupled to the memory controller logic 386 via one or more memory channels or busses. Also, SSD 130 communicates with logic 125 via an interface (such as a SATA, SAS, PCIe, NVMe, etc., interface). Processors 384 and/or controller 382 may compress/decompress data written to or read from NAND devices 392-1 to 392-N.

As illustrated in FIGS. 7 and 8, the SSD 130 may include circuitry 160, which may be in the same enclosure as the SSD 130 and/or fully integrated on a printed circuit board (PCB) of the SSD 130. One or more of the features/aspects/operations discussed with reference to FIGS. 1-6 may be performed by one or more of the components of FIGS. 7 and/or 8. Also, one or more of the features/aspects/operations of FIGS. 1-6 may be programmed into the firmware 390. Further, SSD controller logic 125 may also include circuitry 160. Advantageously, the circuitry 160 may include technology to implement one or more aspects of the system 10 (FIG. 1), the apparatus 14 (FIG. 2), the method 20 (FIGS. 3A TO 3B), the method 40 (FIG. 4), the method 50 (FIG. 5), the timing diagram 60 (FIG. 6), and/or any of the features discussed herein.

For example, the circuitry 160 may be configured to determine if a current workload for a particular NAND device of the one or more NAND devices 392-1 to 392-N is a random write workload, and, if so determined, to disable a program suspend operation (e.g., or PSR operations) for only the particular NAND device. Advantageously, disabling PSR improves tProg and improves I/O per second or random write performance. In some embodiments, the circuitry 160 may be further configured to determine if a host read is pending for the particular NAND device, and, if so determined, to enable the program suspend operation for only the particular NAND device.

For example, the circuitry 160 may be configured to maintain a NDQ (e.g., a command queue) for each of the one or more NAND devices 392-1 to 392-N, and to maintain a HRC (e.g., a counter value) associated with each of the NDQs to count respective host reads for each of the NDQs. In some embodiments, the circuitry 160 may be further configured to increment the HRC associated with the NDQ for the particular NAND device when a command from a host read is placed in the NDQ for the particular NAND device, and to decrement the HRC associated with the NDQ for the particular NAND device when the command from the host read is removed from the NDQ for the particular NAND device. For example, the circuitry 160 may also be configured to determine that the current workload for the particular NAND device of the one or more NAND devices 392-1 to 392-N is the random write workload if the HRC associated with the NDQ for the particular NAND device is zero, and to determine that the host read is pending for the particular NAND device if the HRC associated with the NDQ for the particular NAND device is non-zero.

In other embodiments, the SSD 130 may be replaced with any suitable storage/memory technology/media. In some embodiments, the circuitry 160 may be coupled to one or more substrates (e.g., silicon, sapphire, gallium arsenide, printed circuit board (PCB), etc.), and may include transistor channel regions that are positioned within the one or more substrates. In other embodiments, the SSD 130 may include two or more types of storage media. For example, the bulk of the storage may be NAND and may further include some faster, smaller granularity accessible (e.g., byte-addressable) NVM. The SSD 130 may alternatively, or additionally, include persistent volatile memory (e.g., battery or capacitor backed-up DRAM or SRAM). For example, the SSD 130 may include POWER LOSS IMMINENT (PLI) technology with energy storing capacitors. The energy storing capacitors may provide enough energy (power) to complete any commands in progress and to make sure that any data in the DRAMs/SRAMs is committed to the non-volatile NAND media. The capacitors may act as backup batteries for the persistent volatile memory. As shown in FIGS. 7 and 8, features or aspects of the circuitry 160 may be distributed throughout the system 100, and/or co-located/integrated with various components of the system 100.

ADDITIONAL NOTES AND EXAMPLES

Example 1 includes an electronic apparatus, comprising one or more substrates, and a controller coupled to the one or more substrates, the controller including circuitry to control access to NAND-based storage media that includes a plurality of NAND devices, determine if a current workload for a particular NAND device of the plurality of NAND devices is a random write workload, and, if so determined, disable a program suspend operation for only the particular NAND device.

Example 2 includes the apparatus of Example 1, wherein the circuitry is further to determine if a host read is pending for the particular NAND device, and, if so determined, enable the program suspend operation for only the particular NAND device.

Example 3 includes the apparatus of Example 2, wherein the circuitry is further to maintain a command queue for each of the plurality of NAND devices, and maintain a counter value associated with each of the command queues to count respective host reads for each of the command queues.

Example 4 includes the apparatus of Example 3, wherein the circuitry is further to increment the counter value associated with the command queue for the particular NAND device when a command from a host read is placed in the command queue for the particular NAND device, and decrement the counter value associated with the command queue for the particular NAND device when the command from the host read is removed from the command queue for the particular NAND device.

Example 5 includes the apparatus of Example 4, wherein the circuitry is further to determine that the current workload for the particular NAND device of the plurality of NAND devices is the random write workload if the counter value associated with the command queue for the particular NAND device is zero.

Example 6 includes the apparatus of any of Examples 4 to 5, wherein the circuitry is further to determine that the host read is pending for the particular NAND device if the counter value associated with the command queue for the particular NAND device is non-zero.

Example 7 includes the apparatus of any of Examples 1 to 6, wherein the controller and the NAND-based storage media are incorporated in a solid-state drive.

Example 8 includes an electronic storage system, comprising NAND-based storage media that includes a plurality of NAND devices, and a controller communicatively coupled to the NAND-based storage media, the controller including circuitry to determine if a current workload for a particular NAND device of the plurality of NAND devices is a random write workload, and, if so determined, disable a program suspend operation for only the particular NAND device.

Example 9 includes the system of Example 8, wherein the circuitry is further to determine if a host read is pending for the particular NAND device, and, if so determined, enable the program suspend operation for only the particular NAND device.

Example 10 includes the system of Example 9, wherein the circuitry is further to maintain a command queue for each of the plurality of NAND devices, and maintain a counter value associated with each of the command queues to count respective host reads for each of the command queues.

Example 11 includes the system of Example 10, wherein the circuitry is further to increment the counter value associated with the command queue for the particular NAND device when a command from a host read is placed in the command queue for the particular NAND device, and decrement the counter value associated with the command queue for the particular NAND device when the command from the host read is removed from the command queue for the particular NAND device.

Example 12 includes the system of Example 11, wherein the circuitry is further to determine that the current workload for the particular NAND device of the plurality of NAND devices is the random write workload if the counter value associated with the command queue for the particular NAND device is zero.

Example 13 includes the system of any of Examples 11 to 12, wherein the circuitry is further to determine that the host read is pending for the particular NAND device if the counter value associated with the command queue for the particular NAND device is non-zero.

Example 14 includes the system of any of Examples 8 to 13, wherein the controller and the NAND-based storage media are incorporated in a solid-state drive.

Example 15 includes a method of controlling storage, comprising controlling access to NAND-based storage media that includes a plurality of NAND devices, determining if a current workload for a particular NAND device of the plurality of NAND devices is a random write workload, and, if so determined, disabling a program suspend operation for only the particular NAND device.

Example 16 includes the method of Example 15, further comprising determining if a host read is pending for the particular NAND device, and, if so determined, enabling the program suspend operation for only the particular NAND device.

Example 17 includes the method of Example 16, further comprising maintaining a command queue for each of the plurality of NAND devices, and maintaining a counter value associated with each of the command queues to count respective host reads for each of the command queues.

Example 18 includes the method of Example 17, further comprising incrementing the counter value associated with the command queue for the particular NAND device when a command from a host read is placed in the command queue for the particular NAND device, and decrementing the counter value associated with the command queue for the particular NAND device when the command from the host read is removed from the command queue for the particular NAND device.

Example 19 includes the method of Example 18, further comprising determining that the current workload for the particular NAND device of the plurality of NAND devices is the random write workload if the counter value associated with the command queue for the particular NAND device is zero.

Example 20 includes the method of any of Examples 18 to 19, further comprising determining that the host read is pending for the particular NAND device if the counter value associated with the command queue for the particular NAND device is non-zero.

Example 21 includes the method of any of Examples 15 to 20, wherein the NAND-based storage media is incorporated in a solid-state drive.

Example 22 includes at least one non-transitory machine readable medium comprising a plurality of instructions that, in response to being executed on a computing device, cause the computing device to control access to NAND-based storage media that includes a plurality of NAND devices, determine if a current workload for a particular NAND device of the plurality of NAND devices is a random write workload, and, if so determined, disable a program suspend operation for only the particular NAND device.

Example 23 includes the at least one non-transitory machine readable medium of Example 22, comprising a plurality of further instructions that, in response to being executed on the computing device, cause the computing device to determine if a host read is pending for the particular NAND device, and, if so determined, enable the program suspend operation for only the particular NAND device.

Example 24 includes the at least one non-transitory machine readable medium of Example 23, comprising a plurality of further instructions that, in response to being executed on the computing device, cause the computing device to maintain a command queue for each of the plurality of NAND devices, and maintain a counter value associated with each of the command queues to count respective host reads for each of the command queues.

Example 25 includes the at least one non-transitory machine readable medium of Example 24, comprising a plurality of further instructions that, in response to being executed on the computing device, cause the computing device to increment the counter value associated with the command queue for the particular NAND device when a command from a host read is placed in the command queue for the particular NAND device, and decrement the counter value associated with the command queue for the particular NAND device when the command from the host read is removed from the command queue for the particular NAND device.

Example 26 includes the at least one non-transitory machine readable medium of Example 25, comprising a plurality of further instructions that, in response to being executed on the computing device, cause the computing device to determine that the current workload for the particular NAND device of the plurality of NAND devices is the random write workload if the counter value associated with the command queue for the particular NAND device is zero.

Example 27 includes the at least one non-transitory machine readable medium of any of Examples 25 to 26, comprising a plurality of further instructions that, in response to being executed on the computing device, cause the computing device to determine that the host read is pending for the particular NAND device if the counter value associated with the command queue for the particular NAND device is non-zero.

Example 28 includes the at least one non-transitory machine readable medium of any of Examples 22 to 27, wherein the NAND-based storage media is incorporated in a solid-state drive.

Example 29 includes a storage controller apparatus, comprising means for controlling access to NAND-based storage media that includes a plurality of NAND devices, means for determining if a current workload for a particular NAND device of the plurality of NAND devices is a random write workload, and, if so determined, means for disabling a program suspend operation for only the particular NAND device.

Example 30 includes the apparatus of Example 29, further comprising means for determining if a host read is pending for the particular NAND device, and, if so determined, means for enabling the program suspend operation for only the particular NAND device.

Example 31 includes the apparatus of Example 30, further comprising means for maintaining a command queue for each of the plurality of NAND devices, and means for maintaining a counter value associated with each of the command queues to count respective host reads for each of the command queues.

Example 32 includes the apparatus of Example 31, further comprising means for incrementing the counter value associated with the command queue for the particular NAND device when a command from a host read is placed in the command queue for the particular NAND device, and means for decrementing the counter value associated with the command queue for the particular NAND device when the command from the host read is removed from the command queue for the particular NAND device.

Example 33 includes the apparatus of Example 32, further comprising means for determining that the current workload for the particular NAND device of the plurality of NAND devices is the random write workload if the counter value associated with the command queue for the particular NAND device is zero.

Example 34 includes the apparatus of any of Examples 32 to 33, further comprising means for determining that the host read is pending for the particular NAND device if the counter value associated with the command queue for the particular NAND device is non-zero.

Example 35 includes the apparatus of any of Examples 29 to 34, wherein the NAND-based storage media is incorporated in a solid-state drive.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C. Various components of the systems described herein may be implemented in software, firmware, and/or hardware and/or any combination thereof. For example, various components of the systems or devices discussed herein may be provided, at least in part, by hardware of a computing SoC such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system for controlling a program suspend operation of a NAND device, comprising:
   memory; and
   a controller that is coupled to the memory and configured to at least:
   control access to at least one NAND device;
   determine that a current workload for at least one of the at least one NAND device is a random write workload; and
   in response to determining that a current workload for the at least one of the at least one NAND device is a random write workload, disable a program suspend operation for the at least one of the at least one NAND device.

2. The system of claim 1, wherein the controller is further configured to:
   determine that a host read is pending for the at least one of the at least one NAND device; and
   in response to determining that a host read is pending for the at least one of the at least one NAND device, enable the program suspend operation for only the at least one of the at least one NAND device.

3. The system of claim 2, wherein the controller is further configured to:
   maintain a command queue for each of the at least one NAND device; and
   maintain a counter value associated with each of the command queues to count respective host reads for each of the command queues.

4. The system of claim 3, wherein the controller is further configured to:
   increment the counter value associated with the command queue for the at least one of the at least one NAND device when a command from a host read is placed in the command queue for the at least one of the at least one NAND device; and
   decrement the counter value associated with the command queue for the at least one of the at least one NAND device when the command from the host read is removed from the command queue for the at least one of the at least one NAND device.

5. The system of claim 4, wherein the controller is further configured to:
   determine that the current workload for the at least one of the at least one NAND device is the random write workload if the counter value associated with the command queue for the at least one of the at least one NAND device is zero.

6. The system of claim 4, wherein the controller is further configured to:
   determine that the host read is pending for the at least one of the at least one NAND device if the counter value associated with the command queue for the at least one of the at least one NAND device is non-zero.

7. The system of claim 1, wherein the controller and the at least one NAND device are incorporated in a solid-state drive.

8. A method for controlling a program suspend operation of a NAND device, comprising:
   controlling access to at least one NAND device using a controller;
   determining that a current workload for at least one of the at least one NAND device is a random write workload; and
   in response to determining that a current workload for the at least one of the at least one NAND device is a random write workload, disabling a program suspend operation for the at least one of the at least one NAND device.

9. The method of claim 8, further comprising:
   determining that a host read is pending for the at least one of the at least one NAND device; and
   in response to determining that a host read is pending for the at least one of the at least one NAND device, enabling the program suspend operation for only the at least one of the at least one NAND device.

10. The method of claim 9, wherein the controller is further configured to:
    maintaining a command queue for each of the at least one NAND device; and
    maintaining a counter value associated with each of the command queues to count respective host reads for each of the command queues.

11. The method of claim 10, further comprising:
    incrementing the counter value associated with the command queue for the at least one of the at least one NAND device when a command from a host read is placed in the command queue for the at least one of the at least one NAND device; and
    decrementing the counter value associated with the command queue for the at least one of the at least one NAND device when the command from the host read is removed from the command queue for the at least one of the at least one NAND device.

12. The method of claim 11, further comprising:
determining that the current workload for the at least one of the at least one NAND device is the random write workload if the counter value associated with the command queue for the at least one of the at least one NAND device is zero.

13. The method of claim 11, further comprising:
determining that the host read is pending for the at least one of the at least one NAND device if the counter value associated with the command queue for the at least one of the at least one NAND device is non-zero.

14. The method of claim 8, wherein the controller and the at least one NAND device are incorporated in a solid-state drive.

15. A non-transitory computer-readable medium containing computer executable instructions that, when executed by a controller, cause the controller to perform a method for controlling a program suspend operation of a NAND device, the method comprising:
controlling access to at least one NAND device;
determining that a current workload for at least one of the at least one NAND device is a random write workload; and
in response to determining that a current workload for the at least one of the at least one NAND device is a random write workload, disabling a program suspend operation for the at least one of the at least one NAND device.

16. The non-transitory computer-readable medium of claim 15, further comprising:
determining that a host read is pending for the at least one of the at least one NAND device; and
in response to determining that a host read is pending for the at least one of the at least one NAND device, enabling the program suspend operation for only the at least one of the at least one NAND device.

17. The non-transitory computer-readable medium of claim 16, wherein the controller is further configured to:
maintaining a command queue for each of the at least one NAND device; and
maintaining a counter value associated with each of the command queues to count respective host reads for each of the command queues.

18. The non-transitory computer-readable medium of claim 17, further comprising:
incrementing the counter value associated with the command queue for the at least one of the at least one NAND device when a command from a host read is placed in the command queue for the at least one of the at least one NAND device; and
decrementing the counter value associated with the command queue for the at least one of the at least one NAND device when the command from the host read is removed from the command queue for the at least one of the at least one NAND device.

19. The non-transitory computer-readable medium of claim 18, further comprising:
determining that the current workload for the at least one of the at least one NAND device is the random write workload if the counter value associated with the command queue for the at least one of the at least one NAND device is zero.

20. The non-transitory computer-readable medium of claim 18, further comprising:
determining that the host read is pending for the at least one of the at least one NAND device if the counter value associated with the command queue for the at least one of the at least one NAND device is non-zero.

21. The non-transitory computer-readable medium of claim 15, wherein the controller and the at least one NAND device are incorporated in a solid-state drive.

* * * * *